United States Patent [19]

Montarges et al.

[11] Patent Number: 5,423,069
[45] Date of Patent: Jun. 6, 1995

[54] METHOD OF ALLOCATING CARRIER FREQUENCIES FOR TRANSMISSION WITHIN A TRANSMISSION NETWORK, IN PARTICULAR IN TACTICAL NETWORK

[75] Inventors: Jean Montarges, Fontenay Le Fleury; Claude Destouesse, Argenteuil; Jacques Deygout, Saint Michel Sur Orge, all of France

[73] Assignee: Alcatel Telspace, Nanterre Cedex, France

[21] Appl. No.: 2,413

[22] Filed: Jan. 8, 1993

[30] Foreign Application Priority Data

Jan. 10, 1992 [FR] France .................. 92 00198

[51] Int. Cl.⁶ ............................................. H04B 7/00
[52] U.S. Cl. ................................... 455/62; 455/34.1; 455/56.1
[58] Field of Search ............ 455/11.1, 8, 15, 16, 455/17, 33.1, 33.4, 34.2, 34.1, 53.1, 56.1, 67.1, 62, 63; 379/58, 59, 60, 63; 370/24, 57, 69.1

[56] References Cited

U.S. PATENT DOCUMENTS

| | | | |
|---|---|---|---|
| 3,764,915 | 10/1973 | Cox et al. | 455/33.1 |
| 4,125,808 | 11/1978 | Graham | 455/33.1 |
| 4,965,850 | 10/1990 | Schloemer | 455/34.1 |
| 5,119,500 | 6/1992 | Bickel | 455/15 |
| 5,134,709 | 7/1992 | Bi et al. | 455/33.1 |
| 5,152,002 | 9/1992 | Leslie et al. | 455/16 |

FOREIGN PATENT DOCUMENTS 333764 2/1987 Germany .

OTHER PUBLICATIONS

Milcom88, vol. 3, Oct. 1988, San Diego, USA, pp. 783–791 Linsky "System Control for the Mobile Subscriber Equipment (MSE) Tactical Comunications Network".

Primary Examiner—Reinhard J. Eisenzopf
Assistant Examiner—Thanh Le
Attorney, Agent, or Firm—Sughrue, Mion, Zinn, Macpeak & Seas; Richard C. Turner; Joseph J. Buczynski

[57] ABSTRACT

In a method of allocating carrier frequencies for transmission within a transmission network, such as a tactical network, the set of carrier frequencies constituting the available frequency resource for the network is broken down into batches of unequal size. At the time it enters the network, as indicated by a request for allocation of a frequency for a link between it and another site (referred to as the first connection for the site), and previous to such allocation, any site of the network is allocated one of two complementary states so as to obtain complementary states for the site in question and for its first connection site. These states are retained for subsequent links between the site in question and other sites of the network. For any link to be set up between two sites of the network, a frequency is allocated at random from the largest batch if the sites in question are in complementary states or from a smaller batch if the sites in question are in the identical state.

5 Claims, 3 Drawing Sheets

METHOD OF ALLOCATING CARRIER FREQUENCIES FOR TRANSMISSION WITHIN A TRANSMISSION NETWORK, IN PARTICULAR IN TACTICAL NETWORK

BACKGROUND OF THE INVENTION

1. Field of the invention

The present invention concerns a method of allocating carrier frequencies for transmission within a transmission network.

The invention applies in particular to microwave tactical transmission networks in which frequency allocation is particularly complex because of the extreme agility which characterizes these networks.

2. Description of the Prior Art

As a general rule, in such networks frequency allocation must be random to discourage any attempt at prediction by the enemy. One known method for allocating a frequency to a link between a send equipment located at one site of a network and a receive equipment located at another site of the network allocates frequencies at random from a set of carrier frequencies constituting the available frequency resource of the network after removing from this set frequencies that are prohibited for the link in question because of internal constraints of the network due to the proximity of other send or receive equipments at the sites in question and at nearby sites.

A drawback of any such method is that in practice it leads to blocking situations in which requests for allocation of frequencies cannot be met.

An object of the present invention is to eliminate this drawback.

SUMMARY OF THE INVENTION

The present invention consists in a method of allocating carrier frequencies for transmission within a transmission network, such as a tactical network, comprising:

- breaking down the set of carrier frequencies constituting the available frequency resource for said network into batches of unequal size,
- attributing to any site of the network at the time it enters the network, as indicated by a request for allocation of a frequency for a link between said site and another site referred to hereinafter as the first connection site for the site in question, and previous to such allocation, one of two complementary states such as to obtain complementary states for the site in question and for its first connection site which are retained for subsequent links between the site in question and other sites of the network, and
- for any link to be set up between two sites of said network, allocating a frequency at random from the largest batch if the sites in question are in complementary states or from a smaller batch if the sites in question are in the identical state.

Other objects and features of the invention will emerge from the following description of one embodiment thereof given with reference to the appended drawings.

DETAILED DESCRIPTION OF THE INVENTION

Figure 1:
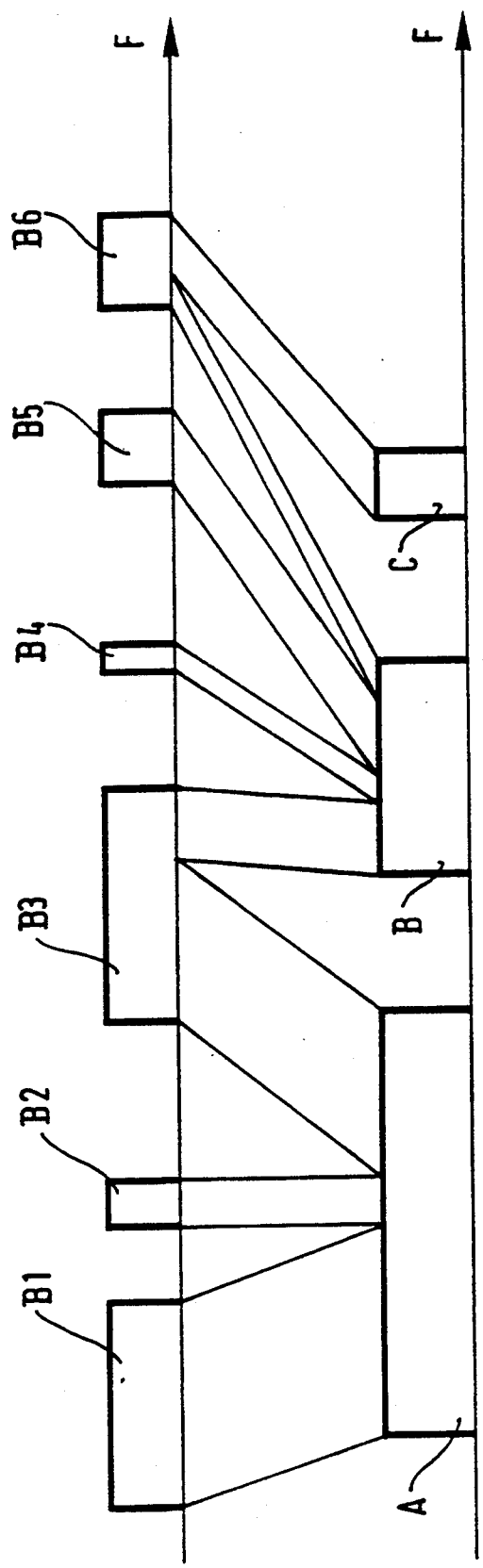
FIG. 1 is a diagram showing a step of a method in accordance with the invention in which the available frequency resource for a network is broken down into batches of unequal size.

FIG. 1 is a diagram showing a typical available frequency resource for a transmission network formed in this case of non-contiguous blocks along the frequency axis, as shown diagrammatically in the first line of the diagram by six blocks B1, B2, B3, B4, B5, B6 of unequal width.

The second line of this diagram shows one example of a breakdown of the frequencies of this resource into three unequal size batches A, B and C of decreasing size.

For example, batch A could constitute 60% of the resource, batch B 30% and batch C 10%. Other breakdowns are naturally possible.

In the example shown in FIG. 1 batch A is formed of blocks B1 and B2 and part of block B3. Batch B is formed of the other part of block B3, blocks B4 and B5 and part of block B6. Batch C is made up of the other part of block B6. Other breakdowns are naturally possible.

Figure 2:
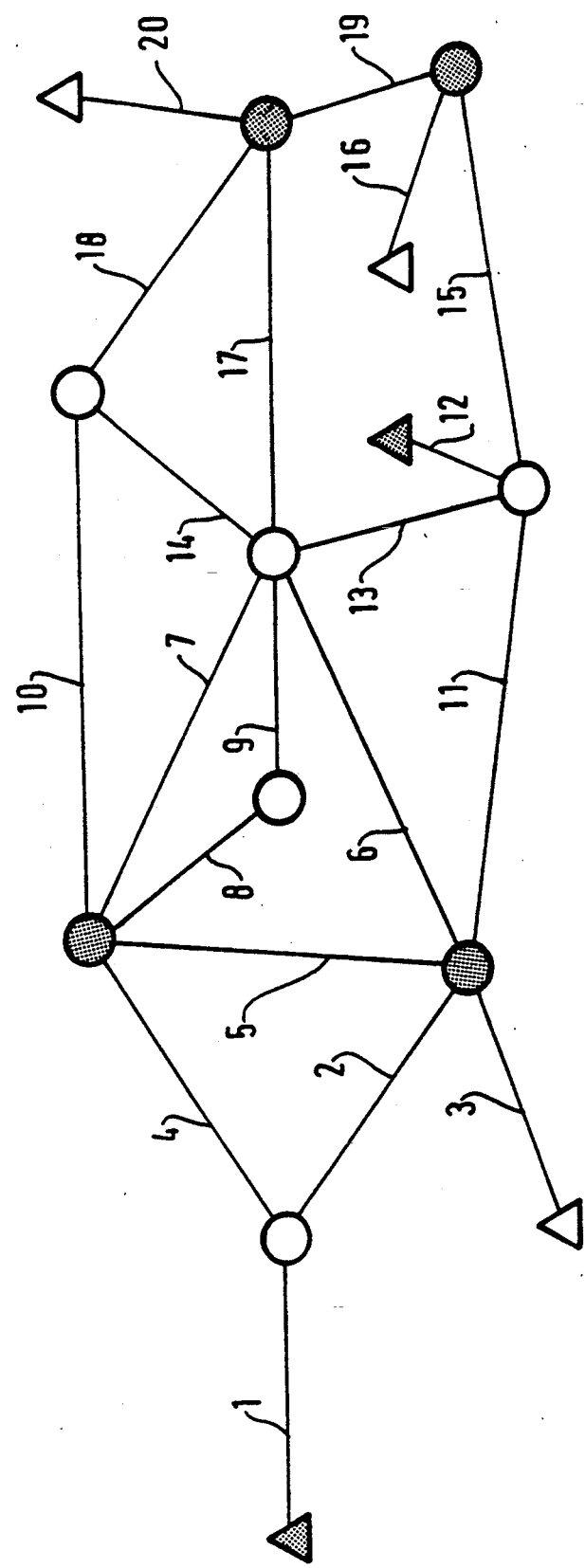
FIG. 2 is a diagram showing a step of a method in accordance with the invention in which one of two complementary states is assigned to any site of the network.

FIG. 2 is a diagrammatic representation of a fully meshed network with network nodes represented by circles, network users represented by triangles and the numbers associated with each user-node or node-node link representing the order in which the links are opened as the network is deployed, that is to say the order of entry of these nodes or users into the network.

The circles and triangles (grouped together under the generic name "sites") are colored black or white to illustrate the method in accordance with the invention now to be described.

Any site at which no link has yet been established is, when it enters the network, that is to say at the time of a request for allocation of a frequency for a link between it and another site, called the first connection site for the site in question, and previously to such allocation:

- is arbitrarily colored (black or white), if said other site is not already colored itself, said other site being then colored oppositely,
- or is colored oppositely to said other site if the latter is already colored.

Thus (as shown in the figure) as the network is deployed the various sites are colored gradually with two alternating colors to define a set of links of alternating colors ("white-black" or "black-white").

For links of this type a frequency is allocated at random from the largest batch A.

A site colored as described above retains the color thus acquired for any subsequent links between it and sites other than the first connection site. It is thus possible that as the network is deployed it is necessary to set up links between sites that are already colored identically.

For these "white-white" or "black-black" links, which are statistically less numerous than the "white-black" and "black-white" links, a frequency is allocated at random from the smaller batch B.

The random allocation of frequencies is thus tempered by a deterministic initial classification of the frequencies. The resulting semi-random frequency allocation eliminates the blocking situations mentioned above.

The provision of a spare batch of frequencies (batch C) enables, as a last resort, attribution of a pair of frequencies to a link for which a frequency could not otherwise be allocated.

The random allocation of the pair of frequencies needed for the thus colored link in the batch corresponding to said color is effected after removing the prohibited frequencies from the batch.

Figure 3:
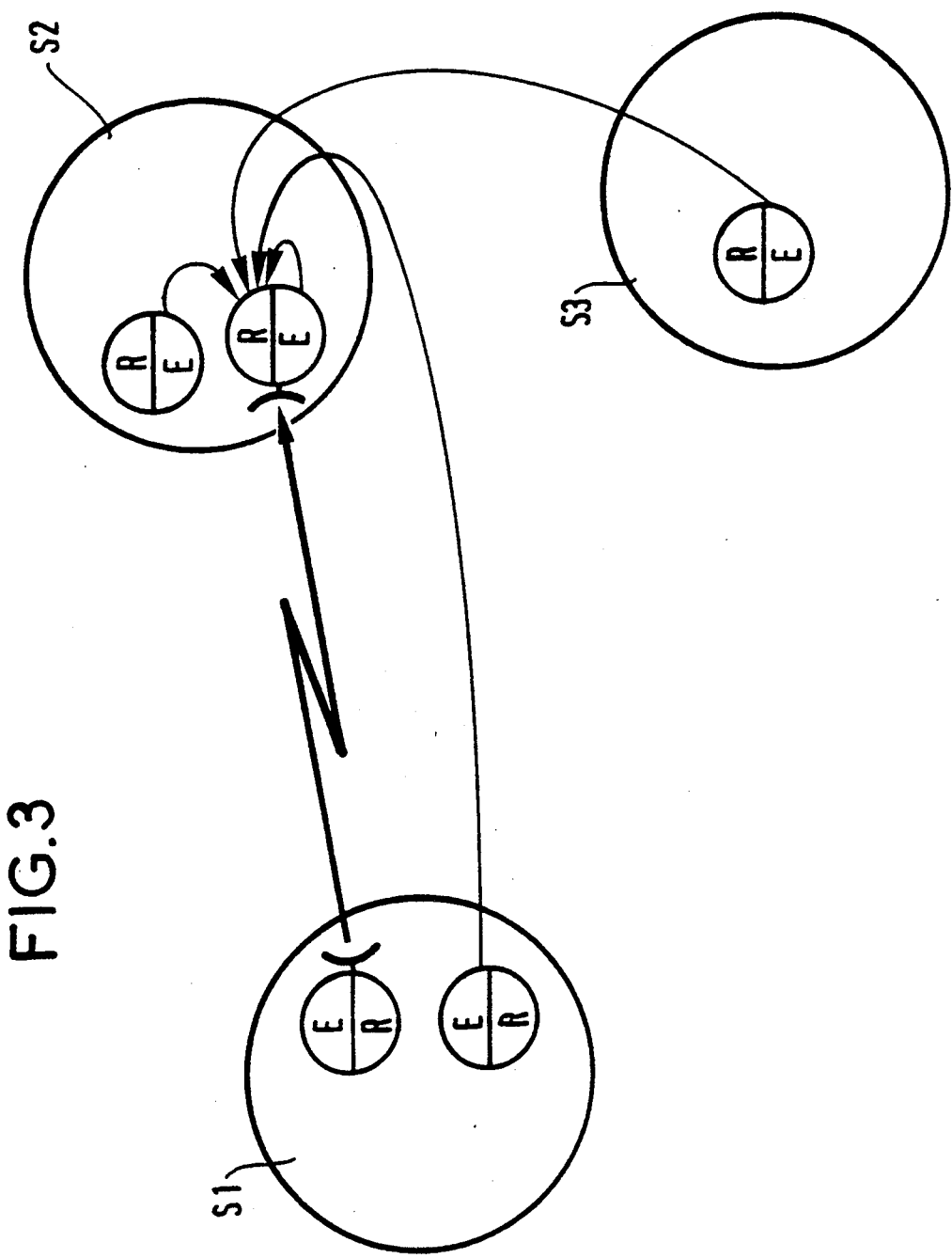
FIG. 3 is a diagram showing constraints internal to the network which lead to the definition of prohibited frequencies.

The FIG. 3 diagram shows the various sources of frequency prohibition.

The figure is a diagrammatic representation of send equipments E and receive equipments R at three nearby sites S1, S2, S3.

For a link to be set up between a sender at site S1 and a receiver at site S2, for example, the following may be regarded as prohibited frequencies, following verification:

a frequency allocated to the sender associated with the receiver in question at site S2, or
  a frequency allocated to a sender at site S2 other than that associated with the receiver in question, or
  a frequency allocated to a sender at site S1 other than the sender in question, or
  a frequency allocated to a sender at a site other than S1 and S2, such as the sender S3.

FIG. 3 shows in thick line the link to be set up and in thin line possible interference with the prohibited frequencies.

There is claimed:

1. A method for allocating carrier frequencies for transmission within a transmission network having a plurality of sites, comprising the steps of:
  segregating a set of said carrier frequencies constituting an available frequency resource for said network into batches of unequal size,
  attributing a first state to any of said sites at the time it enters the network, as indicated by a request for allocation of a frequency for a link between said any of said sites and another of said sites which is a first connection site for said any of said sites, and previous to said allocation, said first state being arbitrarily selected from a plurality of states if no state has already been allocated to said first connection site when said any of said sites enters the network, and said first state being selected opposite to a state of said first connection site if said state of said first connection site exists when said any of said sites enters the network, said any of said sites retaining its said first state for subsequent links between said any of said sites and others of said sites of the network, and
  allocating to two of said sites, linked together, a frequency at random from a largest of said batches as a frequency at which said two of said sites are to communicate with each other if said two of said sites have opposite states and allocating to said two of said sites another frequency selected at random from a smaller of said batches as a frequency at which said two of said sites are to communicate with each other if said two of said sites have identical states.

2. A method according to claim 1, wherein there are three of said unequal size batches and the smallest of said batches is a batch of spare frequencies.

3. A method according to claim 2, wherein the relative sizes of said batches are respectively 60%, 30%, 10%.

4. A method according to claim 1, wherein said allocating step comprises a step of eliminating, based on characteristics of the network, certain frequencies from the one of said batches being allocated to said two of said sites before said one of said batches is allocated to said two of said sites.

5. A method according to claim 1, further comprising the step of attributing a second state, opposite to said first state, to said first connection site after said any of said sites enters the network if no state has already been allocated to said first connection site when said any of said sites enters the network.

* * * * *